United States Patent
Lin

(10) Patent No.: US 7,625,458 B2
(45) Date of Patent: Dec. 1, 2009

(54) METHOD OF MAKING CUSHION MATERIAL

(75) Inventor: Chih-Tao Lin, Taichung Hsien (TW)

(73) Assignee: Tiong Chih Enterprise Co. Ltd., Taichung Hsien (TW)

( * ) Notice: Subject to any disclaimer, the term of this patent is extended or adjusted under 35 U.S.C. 154(b) by 445 days.

(21) Appl. No.: 11/743,810

(22) Filed: May 3, 2007

(65) Prior Publication Data

US 2008/0245469 A1    Oct. 9, 2008

(51) Int. Cl.
*B32B 38/04*    (2006.01)
(52) U.S. Cl. .................. 156/219; 156/253; 156/267; 156/292
(58) Field of Classification Search .......... 156/219, 156/253, 254, 267
See application file for complete search history.

(56) References Cited

U.S. PATENT DOCUMENTS

| | | | | | |
|---|---|---|---|---|---|
| 2,915,785 | A | * | 12/1959 | Valentini | 264/129 |
| 4,731,139 | A | * | 3/1988 | Feyerabend et al. | 156/154 |
| 5,242,519 | A | * | 9/1993 | Wu | 156/154 |

* cited by examiner

*Primary Examiner*—Richard Crispino
*Assistant Examiner*—Barbara J. Musser
(74) *Attorney, Agent, or Firm*—Browdy and Neimark, PLLC

(57) ABSTRACT

A method of making a cushion material includes the steps of pressing a pad onto a die with a plurality of protrusions to form a plurality of protrusion portions on the pad, and then attaching an upper layer on transversely cutting the protrusion portions of the pad to separate the upper layer and the die and form the pad with a plurality of pad members thereon, and then attaching a lower layer on the other side of the pad members to form a three-layer cushion material.

4 Claims, 2 Drawing Sheets

METHOD OF MAKING CUSHION MATERIAL

BACKGROUND OF THE INVENTION

1. Field of the Invention

The present invention relates generally to a cushion or shock-absorbency material, and more particularly to a method of making a cushion material.

2. Description of the Related Art

Typically, a conventional method of making a cushion material, which has a sandwich structure of a fabric, a cushion member and a fabric with a greater gap therebetween, is injection molding. The injection molding process is expensive and needs longer time that doesn't meet the requirement of mass production. To increase the competition in the market, it should be improved

SUMMARY OF THE INVENTION

The primary objective of the present invention is to provide a faster and cheaper method of making a cushion material.

According to the objective of the present invention, a method of making a cushion material includes the steps of pressing a pad onto a die with a plurality of protrusions to form a plurality of protrusion portions on the pad, and then attaching an upper layer on transversely cutting the protrusion portions of the pad to separate the upper layer and the die and form the pad with a plurality of pad members thereon.

DETAILED DESCRIPTION OF THE INVENTION

Figure 1:
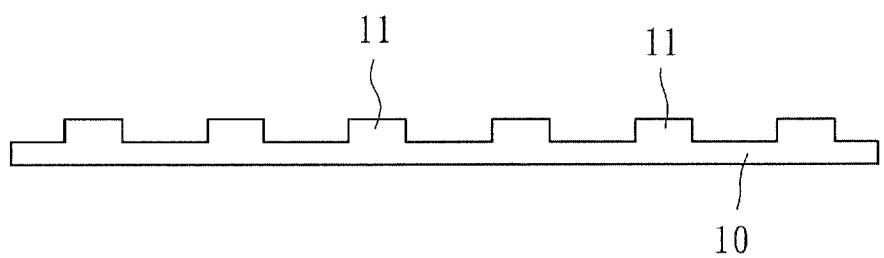
FIG. 1 to FIG. 5 are sectional views of a preferred embodiment of the present invention, showing the procedures to make the cushion material.
Figure 2:
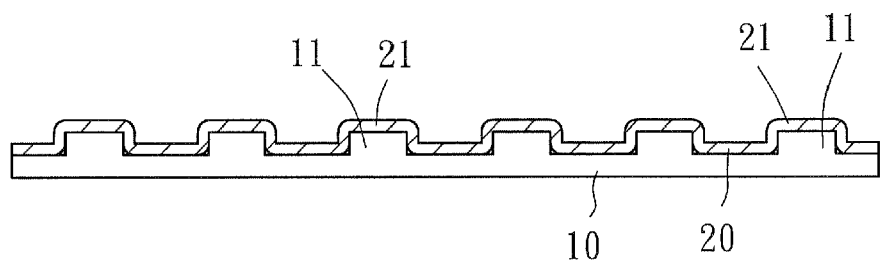
Figure 3:
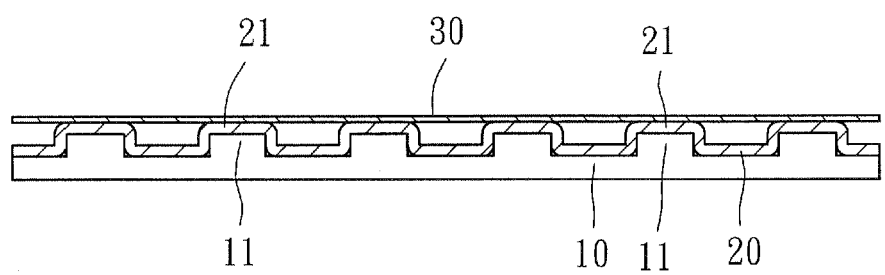
Figure 4:
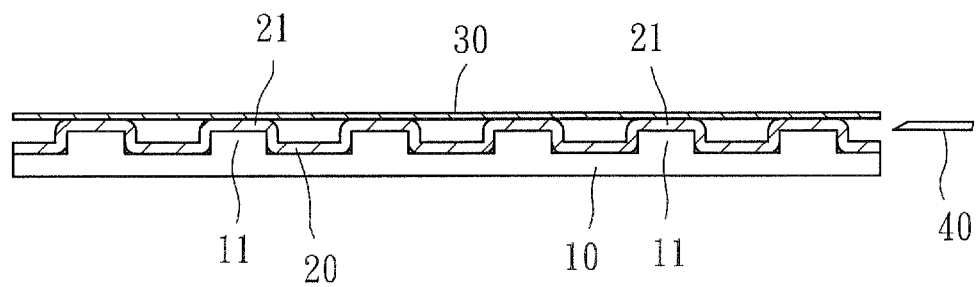
Figure 5:
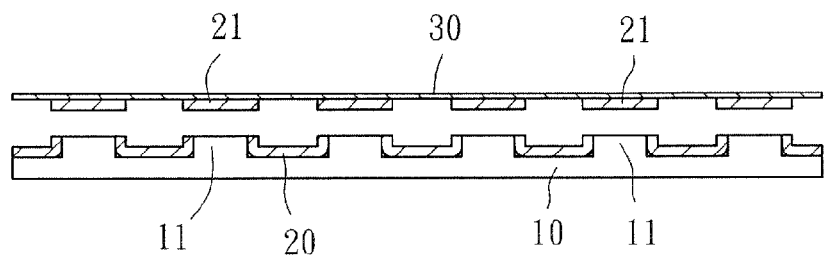
Figure 6:
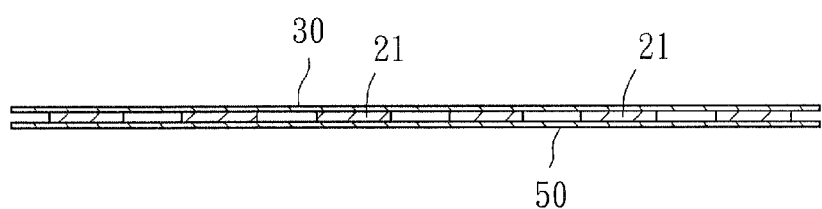
FIG. 6 is a sectional view of the cushion material of the preferred embodiment of the present invention.
Figure 7:
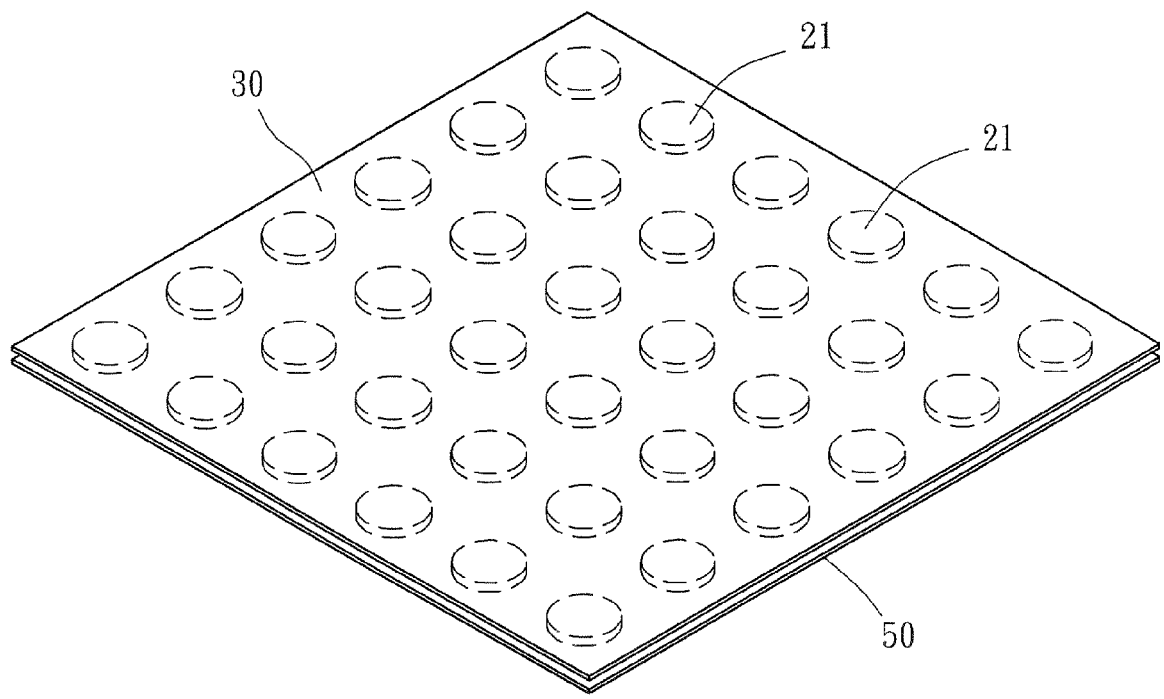
FIG. 7 is a perspective view of the cushion material of the preferred embodiment of the present invention.

As shown in FIG. 1 to FIG. 5, a method of making a cushion material includes the steps of:

a. Preparing a die 10: The die 10 has a plurality of protrusions 11, which shapes and layout are designed by the manufacture. The shapes of the protrusions 11 may be circle, rectangle, triangle or hexagon, and the layout may be matrix or random. In the present embodiment, the protrusions 11 are hexagonal columns and arranged in matrix, as shown in FIG. 1.

b. Providing a pad 20 on the die 10: The pad 10 may be a foamed plastic, EVA or rubber.

c. Pressing the pad 20 to form a plurality of protrusion portions 21 thereon, as shown in FIG. 2. The protrusion portions 21 are formed by the protrusions 11 of the die 10.

d. Attaching an upper layer 30 on the pad 20. The upper layer 30 is attached on distal ends of the protrusion portions 21 of the pad 20, as shown in FIG. 3.

e. Providing a blade mold 40 transversely cutting the protrusion portions 21 of the pad 20 to separate the pad 40 and the die 10. A path of the blade mold 40 crosses between the distal ends of the protrusion portions 21 and the protrusions 11 of the die 10 to form the upper layer 30 with a plurality of the pad members 20 thereon, as shown in FIG. 4 and FIG. 5.

f. Attaching a lower layer 50 on the pad members 20 on the upper layer 30 to form a three-layer cushion material, as shown in FIG. 6 and FIG. 7. The cushion material has the upper layer 30 and the lower layer 50 at a top side and a bottom side thereof and the pad members 20 between upper layer 30 and the lower layer 50.

With the procedures above, it will get the three-layer cushion material. The pad members, which serve cushion function, between the up and lower layers may change their shapes, pitches and pattern by utilizing different die.

The up and lower layers may be made of any suitable materials, such as cotton, linen, nylon, polymer or other materials. The method of pressing the pad onto the die may be cold pressing to form the protrusion portions. The adhesive for attachment the present invention may be ventilation glue or non-ventilation glue or other suitable adhesives.

The present invention provides a faster and cheaper method of making the cushion material for mass production.

The description above is a few preferred embodiments of the present invention and the equivalence of the present invention is still in the scope of the claims of the present invention.

What is claimed is:

1. A method of making a cushion material, comprising the steps of:
   a. providing a die with a plurality of protrusions on a side thereof;
   b. resting a pad on the die on the side with the protrusions;
   c. pressing the pad to form a plurality of protrusions by the protrusions of the die;
   d. attaching an upper layer on distal ends of protrusion portions of the pad; and
   e. providing a blade mold crossing between the protrusions of the die and the protrusion portions of the pad to separate the upper layer and the die and form the pad with a plurality of pad members thereon.

2. The method of making a cushion material as defined in claim 1, further comprising the step of attaching a lower layer on the pad members after the step e to form a sandwich structures of a upper layer, a pad and a lower layer.

3. The method of making a cushion material as defined in claim 2, wherein the upper layer and the lower layer may be made of cotton, linen, nylon, or polymer.

4. The method of making a cushion material as defined in claim 2, wherein the pad may be made of foamed plastic, ethylene vinyl acetate (EVA), or rubber.

* * * * *